United States Patent [19] | [11] 3,731,208
Laatt et al. | [45] May 1, 1973

[54] APPARATUS FOR AND METHOD OF INTEGRATION DETECTION

[75] Inventors: Richard G. Laatt, Longmount; Juan A. Rodriguez, Boulder, both of Colo.

[73] Assignee: Storage Technology Corporation, Boulder, Colo.

[22] Filed: May 17, 1971

[21] Appl. No.: 144,085

[52] U.S. Cl. ..................328/127, 307/229, 307/232, 307/244, 307/269, 328/63, 328/105, 328/109, 328/140
[51] Int. Cl. ..............................................H03k 3/00
[58] Field of Search ........................328/127, 140, 63, 328/72, 75, 105, 106, 109; 307/232, 233, 229, 208, 234, 244, 269

[56] References Cited

UNITED STATES PATENTS

| | | | |
|---|---|---|---|
| 3,217,183 | 11/1965 | Thompson et al. | 307/232 |
| 3,548,327 | 12/1970 | Vermeulen | 307/232 X |
| 2,485,886 | 10/1949 | Johnstone et al. | 328/106 |
| 3,054,958 | 9/1962 | Bensky et al. | 328/106 X |
| 3,311,751 | 3/1967 | Maestre | 307/232 X |
| 3,624,410 | 11/1971 | Bruckert | 307/234 |
| 3,594,649 | 7/1971 | Rauch | 328/127 X |
| 3,140,406 | 7/1964 | Thompson | 328/127 X |

*Primary Examiner*—Stanley T. Krawczewicz
*Attorney*—Woodcock, Washburn, Kurtz & Mackiewicz

[57] ABSTRACT

A variable frequency clock is slaved to phase encoded data arranged in sequential bit cells. The phase encoded data is then exclusively OR'ed with the output of the clock and applied to a pair of AND gates which are alternately enabled during successive bit cells. A pair of integrators operating in a differential mode and utilizing negative feedback are provided, one for the output of each AND gate, to alternately integrate successive bit cells. Since each integrator must only integrate over every other bit cell, ample squelch time is provided after each integration thereby assuring return to the squelch reference level.

8 Claims, 3 Drawing Figures

APPARATUS FOR AND METHOD OF INTEGRATION DETECTION

BACKGROUND OF THE INVENTION

1. Field of the Invention

This invention relates to integration detection of the type utilized in reading magnetic tape.

Integration detection involves the integration of a binary signal representing bits of data. By integrating the signal over individual bit periods and detecting the integrated results, the various bits may be detected with a much higher degree of accuracy than if the level of the binary signal itself were detected. For example, the effects of noise which can result in erroneous bit detection are greatly reduced by integration detection as contrasted with detection of a binary signal itself.

Integration detection is utilized in the reading of phase encoded magnetic tape in computer tape drives where a very high degree of accuracy is required. In the recording of such phase encoded magnetic tape, a flux change on the recording medium is produced for both a "1" and "0" where the flux changes for a "1" and a "0" are in the reverse direction. Since a flux change on the recording medium must occur for each bit written, synchronization of reading can be made self-clocking using the data being read as a synchronizing signal.

On a read operation of the tape, the phase of the incoming data is compared with a variable frequency oscillator having a nominal frequency matching the nominal frequency of the input data. A binary signal is then generated representing the phase comparison with one level representing the in-phase condition and another level representing the out-of-phase condition. The binary signal is then integrated over each bit period of each bit cell with the polarity of the integrated result indicating the value of the bits. Of course, it is necessary that the integrating means performing the integration be squelched after each integration during each bit period to assure that each integration begins at a reference or squelch level. If this squelch level is not maintained, the integration may result in erroneous bit detection.

2. The Prior Art

In the prior art integration detection systems such as that utilized in the IBM 2803 tape control unit, the detection of the bit in each successive bit cell of the binary signal is accomplished by a single integrator. In the case of the 2803 and other such systems, a single integrator is then provided for the binary signal generated from the phase encoded data for each track of a nine track magnetic tape. Since each bit cell on the tape follows immediately after the preceding bit cell, an integrator in such a system has very little time to squelch after integration. In many instances, the relatively short period of time to squelch results in overshoot which may mean that the appropriate squelch reference level is not achieved before the next integration occurs. This may in turn lead to erroneous bit detection since the succeeding integration does not proceed from the appropriate reference level. It will of course be appreciated that the problem of proper squelching is compounded when higher bit cell densities are utilized, since higher bit cell densities shorten the bit periods and thereby necessitate even faster squelching of the integrator.

In an effort to solve the foregoing squelch problem and also compensate for tolerances in the integrator circuitry, the prior art systems such as the IBM 2803 have required numerous adjustments. Not only are these adjustments time comsuming and difficult to make, in many instances the adjustments fail to provide the desirable high degree of accuracy in reading a high bit density phase encoded magnetic tape.

SUMMARY OF THE INVENTION

In accordance with one important aspect of the invention, first and second integrating means are provided for each binary signal to be integrated. The binary signal is then integrated during bit periods for a first set of bit cells by the first integrating means and integrated during bit periods for a second set of bit cells by the second integrating means. By spacing the bit cells of the first set and spacing the bit cells of the second set at least one bit period apart, ample time is provided for squelching the first integrator means and the second integrator means in the space between bit cells of each set.

In further accordance with this aspect of the invention, the binary signal is generated by an exclusive-OR means in combination with a variable frequency oscillator which is slaved to a phase encoded input data signal. The variable frequency oscillator generates a clock signal corresponding to the bit periods of the bit cell in the phase encoded data. By applying the clock signal to the exclusive-OR means along with the phase encoded input data signal, the binary signal is generated at the output of the exclusive-OR means representing the phase encoded data.

In still further accordance with this aspect of the invention, the binary signal is divided into two signals, one signal representing the bit cells of the first set and the second representing the bit cells of the second set. This division is accomplished by first and second AND gate means coupled between the output of the exclusive-OR means and the input to the first and second integrating means respectively. The AND means are alternately enabled by a flip-flop means set and reset by the clock signal from the variable frequency oscillator.

In accordance with another aspect of the invention, an integrating means is provided having a negative feedback path between the output of the integrating means and the input thereof to facilitate squelching and return of the integrated output signal to the appropriate squelch level.

In accordance with another aspect of the invention, the integrating means comprises a differential amplifier having one input coupled to the output of the integrating circuit and another input coupled to a reference potential. By operating the integrating means in the differential mode, the effect of circuit component tolerances on the integrated output is greatly reduced or at least limited to inexpensive circuit components such as resistors.

DETAILED DESCRIPTION OF A PREFERRED EMBODIMENT

Figure 1:
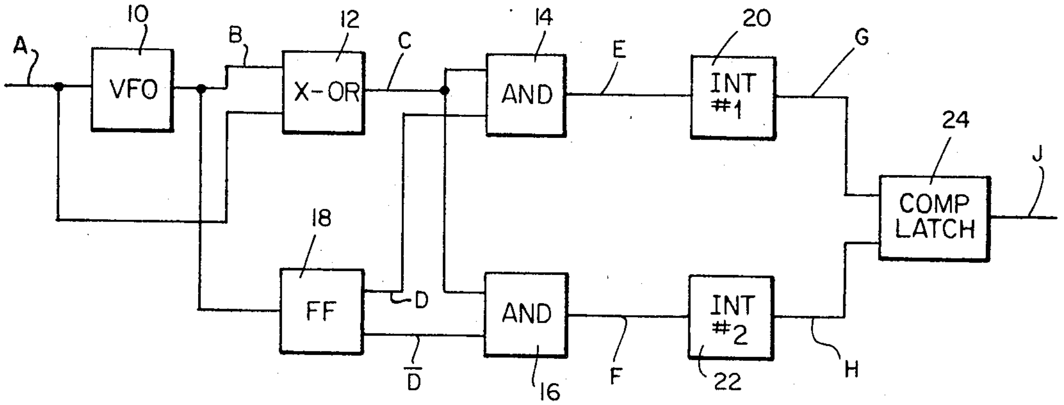
FIG. 1 is a block diagram of an integration detection system embodying the invention.
Figure 2:
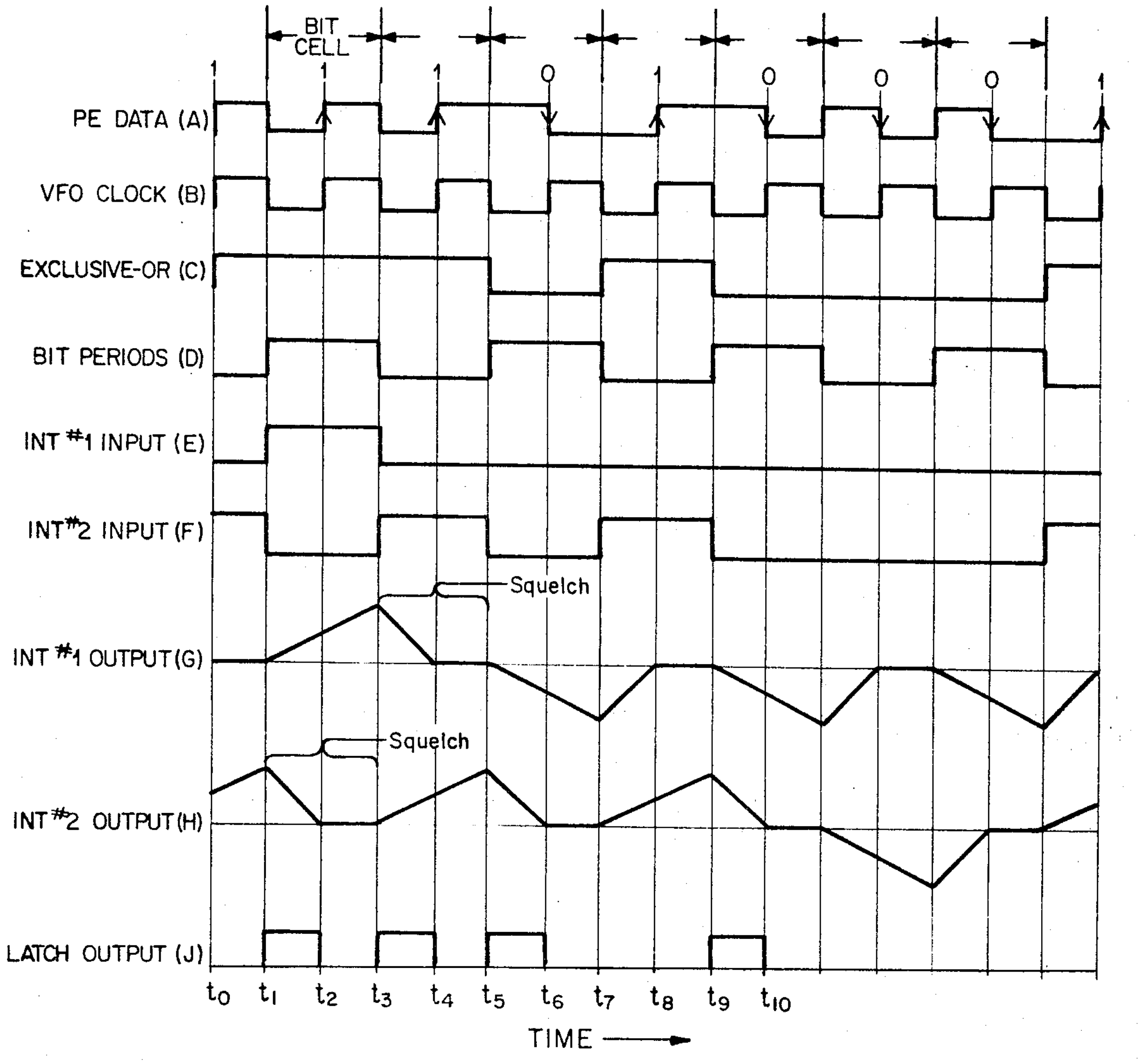
FIG. 2 is a waveform diagram representing the various signals of the block diagram of FIG. 1.

An integration detection system for reading phase encoded data from multi-track magnetic tape of the type utilized in computer tape drives will now be described with reference to FIGS. 1 and 2. (It will of course be appreciated that one such system will be provided for each track on the tape.) A phase encoded data signal A, after amplification, differentiation and limiting, is applied to the input of the variable frequency oscillator 10 having a nominal frequency matching the nominal frequency of the phase encoded data input signal. As shown in FIG. 2, a bit period for a bit cell of the phase encoded data signal A (the arrows on the signal A indicate changes in flux) corresponds with the period for the clock signal B generated by the variable frequency oscillator 10. The variable frequency oscillator is slaved to the input data signal by utilizing phase difference therebetween to produce error signals which are used to change the frequency of the variable frequency oscillator in a direction to minimize the difference. Such an oscillator is incorporated in the IBM 2803.

In order to decode the phase encoded data of the input signal A, the clock signal B and the input signal A are applied to an exclusive-OR gate 12. When the phase of the input data signal A and clock signal B are the same, the corresponding bit cell of the binary signal C generated at the output of the exclusive-OR gate 12 is "1". When the phase of the input data signal A and the clock signal B are opposite, the binary signal C is "0" for that particular bit cell.

In accordance with this invention, the binary signal C is now divided into two binary signals, one binary signal E representing a first set of bit cells and a second binary signal F representing a second set of bit cells. This division is accomplished by a first AND gate 14 and a second AND gate 16 having inputs connected to the output of the exclusive-OR gate means 12. By providing a flip-flop 18 which is set and reset by the clock signal B from the variable frequency oscillator 10, the AND gates 14 and 16 may be alternately enabled by bit period timing signals D and D from the first and second outputs respectively of the flip-flop 18.

The divided signals E and F are now ready for application to a first integrating means 20 and a second integrating means 22. The integrating means 20 and the integrating means 22 which perform both positive and negative integration on the signals E and F during the first set of bit cells and the second set of bit cells respectively provide integrated output signals G and H respectively. The integrated output signals G and H may then be applied to a comparator latch 24 to generate a decoded data signal J which accurately represents the data of the bit cells in the phase encoded input signal A.

As clearly shown in FIG. 2, the first set of bit cells represented by the first integrator input signal E are separated by a full bit period of a bit cell. Similarly, the set of bit cells represented by the second integrator input signal F are also separated by a full bit period of a bit cell. As a consequence, each integrating means 20 and 22 is allowed a full bit period for squelching since each integrating means is only required to integrate alternate bit cells. It has been found and is indeed clearly shown in FIG. 2 that the full bit period permits ample time for squelching thereby assuring a return of the integrated output signals G and H to the squelched reference level.

Figure 3:
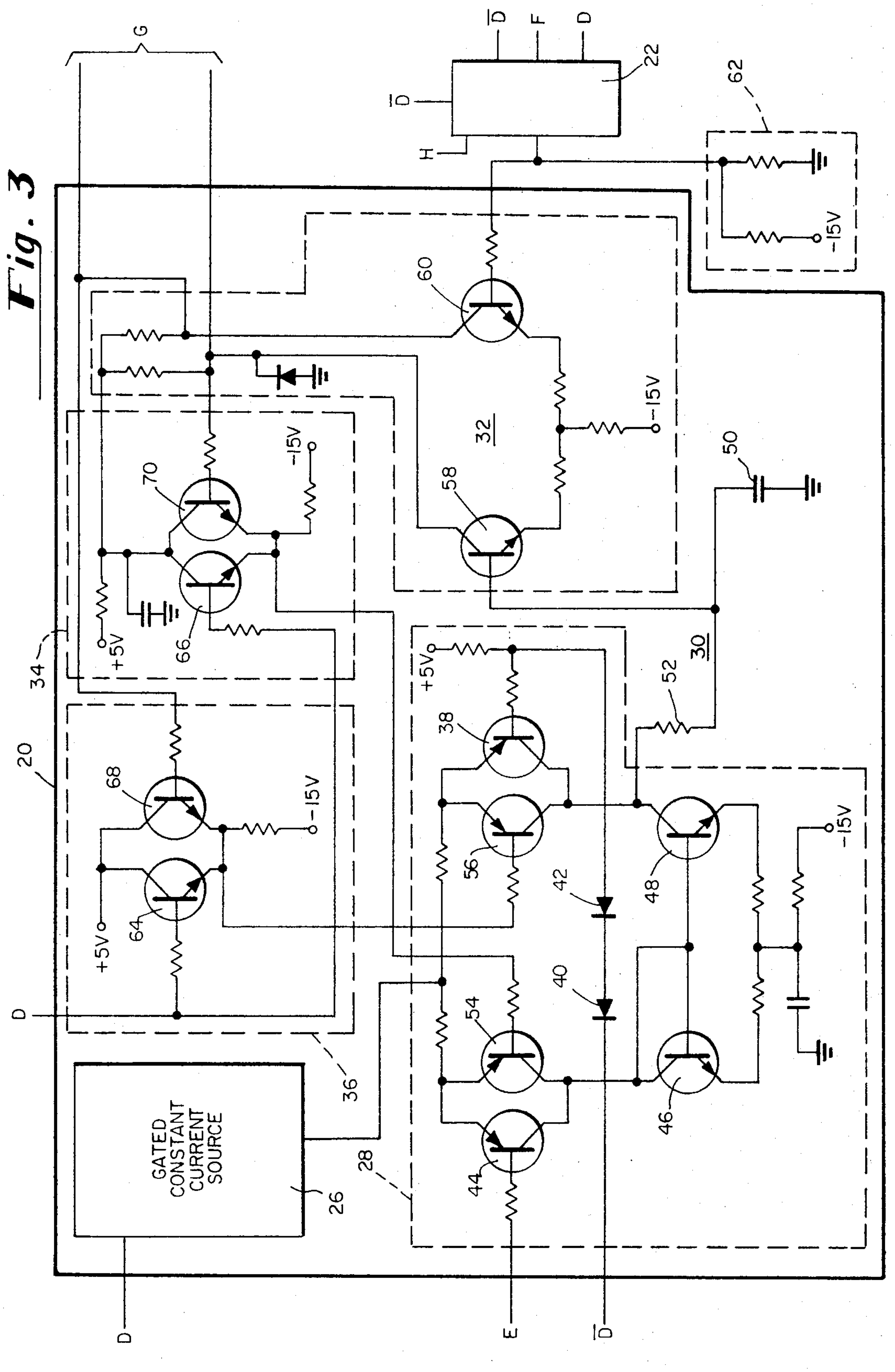
FIG. 3 is a schematic diagram of an integrator circuit embodying the invention.

The integrating means 20 is shown in detail in FIG. 3 as comprising a gated constant current source 26, a switching means 28 for controlling positive integration, negative integration, and squelching, integrating circuit elements 30, a differential amplifier 32, and positive analog OR's 34 and 36. Although not shown in detail, it will be understood that the second integrating means 22 comprises circuitry identical to that of the integrating means 20.

In accordance with one important aspect of the invention, the integrator means 20 only integrates alternate bit cells of the integrator input signal E. This integration of alternate bit cells is accomplished by the switch means 28. During positive integration of the input signal E between times $t_1$ and $t_3$ as shown in FIG. 2, a transistor 38 is turned on in response to the bit period timing signal D applied to the base of the transistor 38 though diodes 40 and 42. During the same period, transistors 44, 46, and 48 remain off in response to the input signal E. As a consequence, a capacitor 50 of the integrator circuit elements 30 is permitted to charge to a positive level through a resistor 52 as shown in FIG. 2 (see integrator output signal G).

At time $t_3$, the current from the source 26 doubles in response to the input D and transistors 54, 56, 46 and 48 are turned to squelch the integrating means 28 and return the charge on the capacitor 50 to the squelch reference level achieved between times $t_4$ and $t_5$.

During negative integration, the transistors 44, 46 and 48 are turned on and the transistor 38 is turned off in response to signals D and E. Referring again to FIG. 2 (see integrator output signal G), it will be seen that the charge in the capacitor 50 now begins to go negative reaching a maximum at time $t_7$. Once again, transistors 54, 56, 46, and 48 are turned on to squelch the integrating means returning the capacitor to the squelch reference level at approximately $t_8$. Note that the squelch level is the same after positive and negative integration.

In accordance with the one aspect of the invention, the integrator operates in a differential mode. This is accomplished by the differential amplifier 32 having a transistor 58 coupled to the output of the integrating circuit elements 30 and another input transistor 60 coupled to the source 62 of reference potential. By operating in the differential mode provided by the differential amplifier means 32, transistor tolerances are self-compensating to a very great extent thereby eliminating the need for extensive adjustments in the integrating means.

In accordance with another aspect of the invention, the positive analog OR's 34 and 36 provide negative feedback for assuring return to the reference squelch level. Upon the application of the bit period timing signal D to the respective bases of transistors 64 and 66, transistors 64 and 66 are turned off and transistors 68 and 70 function as emitter followers providing a negative feedback path between the outputs of the differential amplifier 32 and the bases of the transistors 54 and 56. Simultaneously, the gated constant current source doubles the value of a current applied to the emitters of the transistors 54 and 56.

Note that the source of reference potential 62 is common to both the integrating means 20 and the integrating means 22. Note further that the integrating means 22 is made to operate on the alternate bit cells by utilizing the inverse of bit period timing signals D and D to perform control of the positive integration, negative integration and squelching functions.

Although the invention has been described in terms of reading a phase encoded data input signal, it will be appreciated that the invention may be utilized in any system wherein integration detection is utilized. Indeed, the invention may be utilized whenever it is desirable to integrate any binary signal. It will also be understood that the invention could be embodied in a system utilizing more than two integrators thereby by providing even more time for squelching.

Although a specific embodiment of the invention has been shown and described, it should be understood that various modifications may be made without departing from the spirit and scope of the invention as set forth in appended claims.

What is claimed:

1. Apparatus for integrating a binary input signal read from a magnetic tape comprising a series of bit cells including:

a clock means synchronized with said bit cells of said binary signal;

a means for dividing said input signal into a first binary signal comprising a first set of said bit cells representing both binary values and a second binary signal comprising a second set of said bit cells representing both binary values, the respective bit periods for bit cells in said first set lying between the respective bit periods for bit cells in said second set;

a first integrating means having said first binary signal applied to the input thereof, said first integrating means integrating said first binary signal during said first set of bit cells irrespective of the binary values of said bit cells, said clock means being coupled to said first integrating means for controlling integration of said binary signal during said first set of bit cells in said series, said clock means also controlling squelching of said first integrating means so as to squelch said first integrating means during said second set of bit cells;

a second integrating means having said second binary signal applied to the input thereof, said second integrating means integrating said second binary signal during said second set of bit cells irrespective of the binary values of said bit cells, said clock means being coupled to said second integrating means for controlling integration of said binary signal during said second set of bit cells in said series, said clock means also controlling squelching of said second integrating means so as to squelch said second integrating means after said second set of bit cells; and a means coupled to said first integrating means and said second integrating means for detecting the level of the integrated binary signals for each bit cell in said first set and said second set to determine the value of the bit in each bit cell.

2. The apparatus of claim 1 further comprising:

a source of phase encoded data, said clock means including a variable frequency oscillator means coupled to the output of said source for generating a clock signal slaved to said phase encoded data, each clock cycle of said clock signal representing a bit period for a bit cell of said phase encoded data and said binary input signal; and an exclusive-OR means coupled to said source and said oscillator means for generating said binary input signal from said clock signal and said phase encoded data.

3. The apparatus of claim 2 wherein said clock means further includes a flip-flop means coupled to said oscillator means and set by said clock signal, said apparatus further comprising:

a first AND gate means coupled between said exclusive-OR means and said first integrating means, said first AND gate being coupled to and enabled by a first output of said flip-flop means so as to enable said first AND gate means during said first set of bit cells; and a second AND gate means coupled between said exclusive-OR means and said second integrator means, said second AND gate means being coupled to and enabled by a second output of said flip-flop means so as to enable said second AND gate means during said second set of bit cells.

4. The apparatus of claim 3 wherein said first integrating means and said second integrating means each comprise:

an integrating circuit element; and a switch means coupled to the output of the respective AND gate means, said flip-flop means, and said integrating circuit element, said switch means applying a signal for integration to the input of said integrating circuit element during bit periods of said bit cells in one of said sets and applying a signal to squelch said integrating circuit element between the bit cells in said one set.

5. The apparatus of claim 4 wherein said first and said second integrating means each further comprises a negative feedback means between the output of said integrating circuit element and said switching means, said negative feedback means facilitating squelching and return of said output signal of said integrating circuit elements to the appropriate squelch level.

6. The apparatus of claim 5 wherein said first and said second integrating means each further comprises:

a source of reference potential; and a differential amplifier having a first input connected to said integrating elements and a second input connected to said source of reference potential, the output of said differential amplifier representing the integration of the output from the respective AND gate means during bit periods of said bit cells in one of said sets, said output from said differential amplifier returning to said squelch level between said bit cells of said one set.

7. The apparatus of claim 6 wherein said source of reference potential is common to said first integrating means and said second integrating means.

8. A method of detecting bits in a phase encoded data signal comprising a series of bit cells read from a magnetic tape, said method including the steps of:

generating a variable frequency clock signal slaved to said phase encoded input data, one cycle of said variable frequency clock signal corresponding to one bit cell of said phase encoded data signal;

comparing the phase of said clock signal with the phase of said data signal;

generating a binary signal having one value when the phases in a bit cell are the same and another value when the phases in the bit cell are opposite;

dividing said binary signal into two binary signals, the first of said signals comprising alternate bit cells containing both binary values and the second of said signals comprising said succeeding alternate bit cells, containing both binary values;

integrating said first binary signal during alternate bit cells with a first integrating means and squelching said first integrating means during said succeeding alternate bit cells; and integrating said second binary signal during said succeeding alternate bit cells with a second integrating means and squelching said second integrating means during said alternate bit cells.

* * * * *

Disclaimer 3,731,208.—*Richard G. Laatt*, Longmount, and *Juan A. Rodriguez*, Boulder, Colo. APPARATUS FOR AND METHOD OF INTEGRATION DETECTION. Patent dated May 1, 1973. Disclaimer filed June 28, 1974, by the assignee, *Storage Technology Corporation*.

Hereby enters this disclaimer to claims 1–4 and 8 of said patent.

[*Official Gazette August 6, 1974.*]